United States Patent
Palmer et al.

(10) Patent No.: US 9,934,601 B2
(45) Date of Patent: Apr. 3, 2018

(54) THREE-DIMENSIONAL SURFACE TEXTURING

(71) Applicant: MakerBot Industries, LLC, Brooklyn, NY (US)

(72) Inventors: Mark Palmer, Astoria, NY (US); Benjamin R. McCallum, New York, NY (US); Quynh Dinh, New York, NY (US); Andrew J. Askedall, Baldwin, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 76 days.

(21) Appl. No.: 14/804,758

(22) Filed: Jul. 21, 2015

(65) Prior Publication Data

US 2017/0024925 A1    Jan. 26, 2017

(51) Int. Cl.
*G06T 15/04* (2011.01)
*G06T 19/20* (2011.01)
*B29C 67/00* (2017.01)

(52) U.S. Cl.
CPC .......... *G06T 15/04* (2013.01); *B29C 67/0088* (2013.01); *G06T 19/20* (2013.01); *G06T 2219/2024* (2013.01)

(58) Field of Classification Search
None
See application file for complete search history.

(56) References Cited

U.S. PATENT DOCUMENTS

| 7,907,838 | B2 | 3/2011 | Nasiri et al. |
| 8,179,563 | B2 | 5/2012 | King et al. |
| 2002/0154132 | A1* | 10/2002 | Dumesny ............... G06T 15/04 345/582 |
| 2003/0177448 | A1* | 9/2003 | Levine ............... H04N 1/00127 715/201 |
| 2005/0237581 | A1* | 10/2005 | Knighton ............... G01B 11/24 358/473 |

(Continued)

OTHER PUBLICATIONS

Pachal, Pete, "Structure Sensor Turns the iPad Into a Powerful 3D Scanner [Hands on]", http://mashable.com/2013/09/17/structure-sensor/#3zqVieqflaqi Sep. 17, 2013, 23 pages.

(Continued)

*Primary Examiner* — Andrew G Yang
(74) *Attorney, Agent, or Firm* — Strategic Patents, P.C.

(57) ABSTRACT

A scanned texture can be applied to a three-dimensional model using a scanner. A user can scan a surface texture with a three-dimensional scanner and then use the same scanner as a three-dimensional input device to apply the texture to a three-dimensional model displayed in a virtual modeling environment. To accomplish this, the surface texture may first be isolated and extracted from a scanned surface. The surface texture can then be applied to a three-dimensional model in a virtual workspace by using the scanner as a navigational and control input. Thus, in a similar manner and motion in which a real-world object is scanned, the surface texture can be applied to the digital model displayed in the virtual modeling environment. The scanner therefore provides a user with a simple and intuitive way in which to capture physical surface textures and apply them to digital objects.

18 Claims, 5 Drawing Sheets (56) References Cited

U.S. PATENT DOCUMENTS

| | | | |
|---|---|---|---|
| 2009/0068617 A1* | 3/2009 | Lauren | A61C 13/0004 433/213 |
| 2014/0043436 A1 | 2/2014 | Bell et al. | |
| 2014/0232693 A1* | 8/2014 | Schuckle | G06F 3/0386 345/175 |
| 2015/0056317 A1* | 2/2015 | Chen | B29C 67/0055 425/130 |
| 2015/0269785 A1* | 9/2015 | Bell | G06T 19/003 345/427 |
| 2015/0325044 A1* | 11/2015 | Lebovitz | G06T 15/04 345/420 |

OTHER PUBLICATIONS

"ReconstructMe Real Time 3D Scanning Software", http://reconstructme.net/ Jul. 8, 2010, 1 page.

"3D Printing with Kinect", http://www.makerbot.com/blog/2011/05/26/3d-printing-with-kinect May 26, 2011, 7 pages.

Nuchter, Andreas et al., "Consistent 3D Model Construction with Autonomous Mobile Robots", Fraunhofer Institute for Autonomous Intelligent Systems (AIS) Schloss Birlinghoven, D-53754 Sankt Augustin, Germany 2013, 15 pages.

"Arduino & Accelerometer Connection Blend Swap", http://www.blendswap.com/blends/view/66856 Feb. 28, 2013, 5 pages.

Conrad, David, "Any Mobile Camera Can Be A 3D Scanner", Dec. 10, 2013, 6 pages.

* cited by examiner

THREE-DIMENSIONAL SURFACE TEXTURING

TECHNICAL FIELD

The disclosure relates to techniques for adding a scanned surface feature to a three-dimensional model using a scanner, and more specifically to a scanner that effectively copies a surface feature from an object and then pastes that surface feature onto a three-dimensional model.

BACKGROUND

Texture mapping of three-dimensional models is well-known. This includes techniques for mapping a texture onto the geometric surface of a three-dimensional model through, e.g., fragmenting the texture based on predefined rasterization requirements, fragmenting the surface of the model, associating each texture fragment with a corresponding surface fragment, and adding texture to a series of predetermined shapes on a model based on corresponding shapes of an object. There remains a need for a scanning system that effectively copies a texture from a physical object and pastes that texture onto a three-dimensional model using a three-dimensional scanner.

SUMMARY

A scanned texture can be applied to a three-dimensional model using a scanner. A user can scan a surface texture with a three-dimensional scanner and then use the same scanner as a three-dimensional input device to apply the texture to a three-dimensional model displayed in a virtual modeling environment. To accomplish this, the surface texture may first be isolated and extracted from a scanned surface. The surface texture can then be applied to a three-dimensional model in a virtual workspace by using the scanner as a navigational and control input. Thus, in a similar manner and motion in which a real-world object is scanned, the surface texture can be applied to the digital model displayed in the virtual modeling environment. The scanner therefore provides a user with a simple and intuitive way in which to capture physical surface textures and apply them to digital objects.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

In the following description, terms such as "first," "second," "top," "bottom." "above," "below," and the like, are words of convenience and are not to be construed as limiting unless expressly stated otherwise.

The following description emphasizes three-dimensional printers using fused deposition modeling or similar techniques where a bead of material is extruded in a layered series of two dimensional patterns as "roads," "paths," or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer," "three-dimensional printer," "fabrication system," and so forth, unless a more specific meaning is explicitly provided or is otherwise clear from the context.

Figure 1:
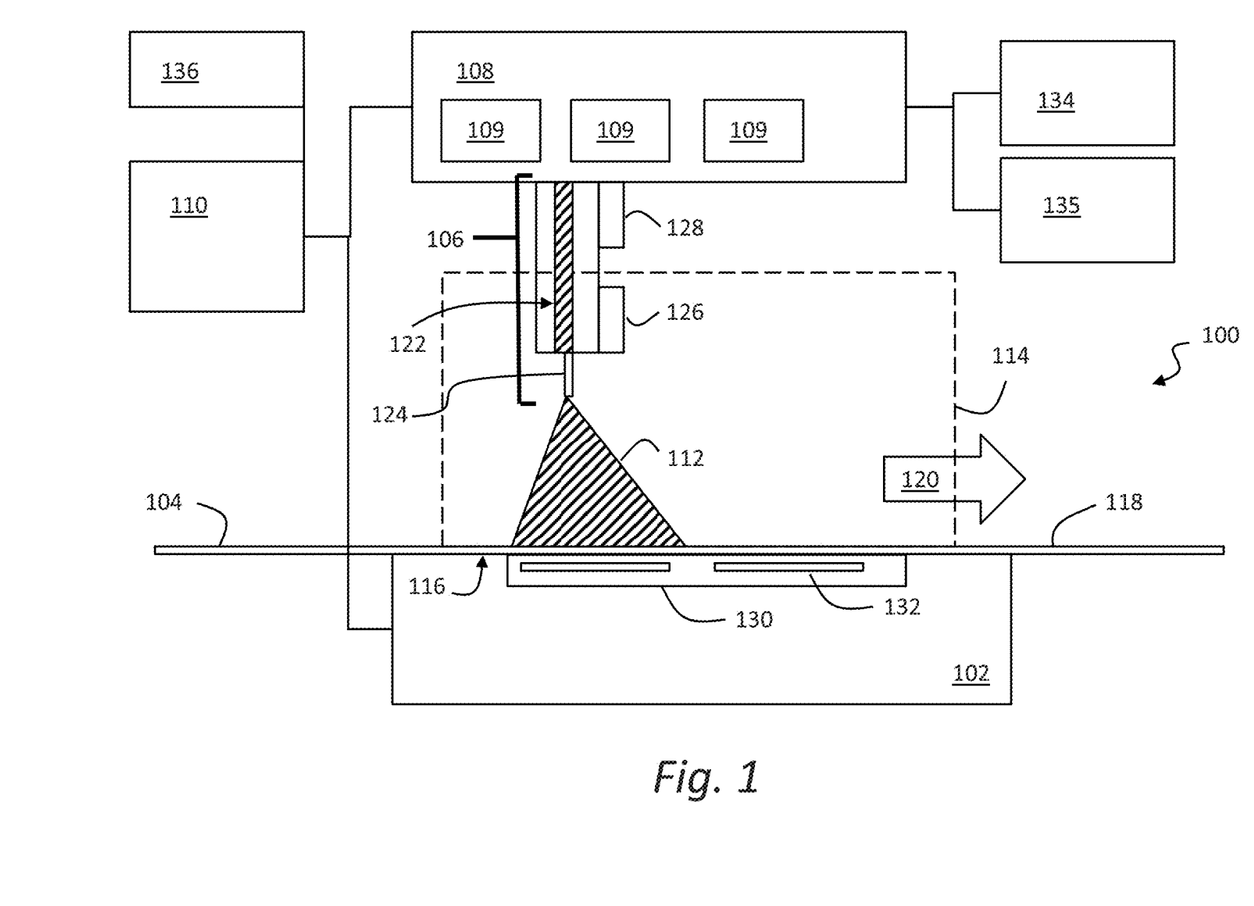
FIG. 1 is a block diagram of a three-dimensional printer.

FIG. 1 is a block diagram of a three-dimensional printer. In general, the printer 100 may include a build platform 102, a conveyor 104, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may support the conveyer 104 in order to provide a fixed, dimensionally and positionally stable platform on which to build the object 112.

The build platform 102 may include a thermal element 130 that controls the temperature of the build platform 102 through one or more active devices 132 such as resistive elements that convert electrical current into heat, Peltier effect devices that can create a heating or cooling effect, or any other thermoelectric heating and/or cooling devices. Thus the thermal element 130 may be a heater that provides active heating to the build platform 102, a cooling element that provides active cooling to the build platform 102, or a combination of these. The heater 130 may be coupled in a communicating relationship with the controller 110 in order for the controller 110 to controllably impart heat to or remove heat from the surface 116 of the build platform 102. Thus, the thermal element 130 may include an active cooling element positioned within or adjacent to the build platform 102 to controllably cool the build platform 102.

It will be understood that a variety of other techniques may be employed to control a temperature of the build platform 102. For example, the build platform 102 may use a gas cooling or gas heating device such as a vacuum chamber or the like in an interior thereof, which may be quickly pressurized to heat the build platform 102 or vacated to cool the build platform 102 as desired. As another example, a stream of heated or cooled gas may be applied directly to the build platform 102 before, during, and/or after a build process. Any device or combination of devices suitable for controlling a temperature of the build platform 102 may be adapted to use as the thermal element 130 described herein.

The conveyer 104 may be formed of a sheet 118 of material that moves in a path 120 through the working volume 114. Within the working volume 114, the path 120 may pass proximal to the surface 116 of the build platform 102—that is, resting directly on or otherwise supported by the surface 116—in order to provide a rigid, positionally stable working surface for a build. It will be understood that while the path 120 is depicted as a unidirectional arrow, the path 120 may be bidirectional, such that the conveyer 104 can move in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyor may include a motor or other similar drive mechanism (not shown) coupled to the controller 110 to control movement of the sheet 118 of material along the path 120. Various drive mechanisms are described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to about seven thousandths of an inch, or any other thickness that permits the sheet 118 to follow the path 120 of the conveyer 104. For example, with sufficiently strong material, the sheet 118 may have a thickness of about one to about three thousandths of an inch. The sheet 118 may instead be formed of sections of rigid material joined by flexible links.

A working surface of the sheet 118 (e.g., an area on the top surface of the sheet 118 within the working volume 114) may be treated in a variety of manners to assist with adhesion of build material to the surface 118 and/or removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to further facilitate build processes as described herein. For example, the chemical treatment may include a deposition of material that can be chemically removed from the conveyer 104 by use of water, solvents, or the like. This may facilitate separation of a completed object from the conveyer by dissolving the layer of chemical treatment between the object 112 and the conveyer 104. The chemical treatments may include deposition of a material that easily separates from the conveyer such as a wax, mild adhesive, or the like. The chemical treatment may include a detachable surface such as an adhesive that is sprayed on to the conveyer 104 prior to fabrication of the object 112.

In one aspect, the conveyer 104 may be formed of a sheet of disposable, one-use material that is fed from a dispenser and consumed with each successive build.

In one aspect, the conveyer 104 may include a number of different working areas with different surface treatments adapted for different build materials or processes. For example, different areas may have different textures (smooth, abraded, grooved, etc.). Different areas may be formed of different materials. Different areas may also have or receive different chemical treatments. Thus a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heaters suitable for creating heat within the chamber 122 to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. Other techniques may be employed for three-dimensional printing, including extrusion-based techniques using a build material that is curable and/or a build material of sufficient viscosity to retain shape after extrusion.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and the like. Any such arrangement suitable for controllably positioning the extruder 106 within the working volume 114 may be adapted to use with the printer 100 described herein.

By way of example and not limitation, the conveyor 104 may be affixed to a bed that provides x-y positioning within the plane of the conveyor 104, while the extruder 106 can be independently moved along a z-axis. As another example, the extruder 106 may be stationary while the conveyor 104 is x, y, and z positionable. As another example, the extruder 106 may be x, y, and z positionable while the conveyor 104 remains fixed (relative to the working volume 114). In yet another example, the conveyer 104 may, by movement of the sheet 118 of material, control movement in one axis (e.g., the y-axis), while the extruder 106 moves in the z-axis as well as one axis in the plane of the sheet 118. Thus in one aspect, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through the network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor or the like embedded within or attached below the surface of the build platform 102. This may also or instead include an infrared detector or the like directed at the surface 116 of the build platform 102 or the sheet 118 of material of the conveyer 104. Other sensors that may be usefully incorporated into the printer 100 as the sensor 134 include a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyer 104. This may include an optical detector arranged in a beam-breaking configuration to sense the presence of the object 112 at a location such as an end of the conveyer 104. This may also or instead include an imaging device and image processing circuitry to capture an image of the working volume 114 and analyze the image to evaluate a position of the object 112. This sensor 134 may be used for example to ensure that the object 112 is removed from the conveyor 104 prior to beginning a new build at that location on the working surface such as the surface 116 of the build platform 102. Thus the sensor 134 may be used to determine whether an object is present that should not be, or to detect when an object is absent. The feedback from this sensor 134 may be used by the controller 110 to issue processing interrupts or otherwise control operation of the printer 100.

The sensor 134 may include a sensor that detects a position of the conveyer 104 along the path. This information may be obtained from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (instead of or in addition to the thermal element 130) to heat the working volume 114 such as a radiant heater or forced hot air to maintain the object 112 at a fixed, elevated temperature throughout a build. The sensor 134 may also or instead include a cooling element to maintain the object 112 at a predetermined sub-ambient temperature throughout a build.

The sensor 134 may also or instead include at least one video camera. The video camera may generally capture images of the working volume 114, the object 112, or any other hardware associated with the printer 100. The video camera may provide a remote video feed through the network interface 136, which feed may be available to remote users through a user interface maintained by, e.g., remote hardware, or within a web page provided by a web server hosted by the three-dimensional printer 100. Thus, in one aspect there is a user interface adapted to present a video feed from at least one video camera of a three-dimensional printer to a remote user through a user interface.

The sensor 134 may include may also include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In another aspect, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including without limitation pass/fail decisions, error detection (and corresponding audible or visual alerts), shape detection, position detection, orientation detection, collision avoidance, and the like.

Other components, generically depicted as other hardware 135, may also be included, such as input devices including a keyboard, touchpad, mouse, switches, dials, buttons, motion sensors, and the like, as well as output devices such as a display, a speaker or other audio transducer, light emitting diodes, and the like. Other hardware 135 may also or instead include a variety of cable connections and/or hardware adapters for connecting to, e.g., external computers, external hardware, external instrumentation or data acquisition systems, and the like.

The printer 100 may include, or be connected in a communicating relationship with, a network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple into a local area network or the like that is in turn coupled to a data network such as the Internet. This may also or instead include hardware/software for a WiMax connection or a cellular network connection (using, e.g., CDMA, GSM, LTE, or any other suitable protocol or combination of protocols). Consistently, the controller 110 may be configured to control participation by the printer 100 in any network to which the network interface 136 is connected, such as by autonomously connecting to the network to retrieve printable content, or responding to a remote request for status or availability.

Devices, systems, and methods for adding a scanned surface feature to a three-dimensional model will now be described. Specifically, techniques may include scanning a surface feature (e.g., a texture, a color, or a surface finish) from an object using a three-dimensional scanner and then using the three-dimensional scanner to apply the surface feature to a three-dimensional model. In this manner, the scanner acts as a "three-dimensional mouse" or a "digital spray-paint can" that provides a user with a simplistic way in which to capture surface topography and two-dimensional features (e.g., images and color), and then apply these features to digital objects.

Figure 2:
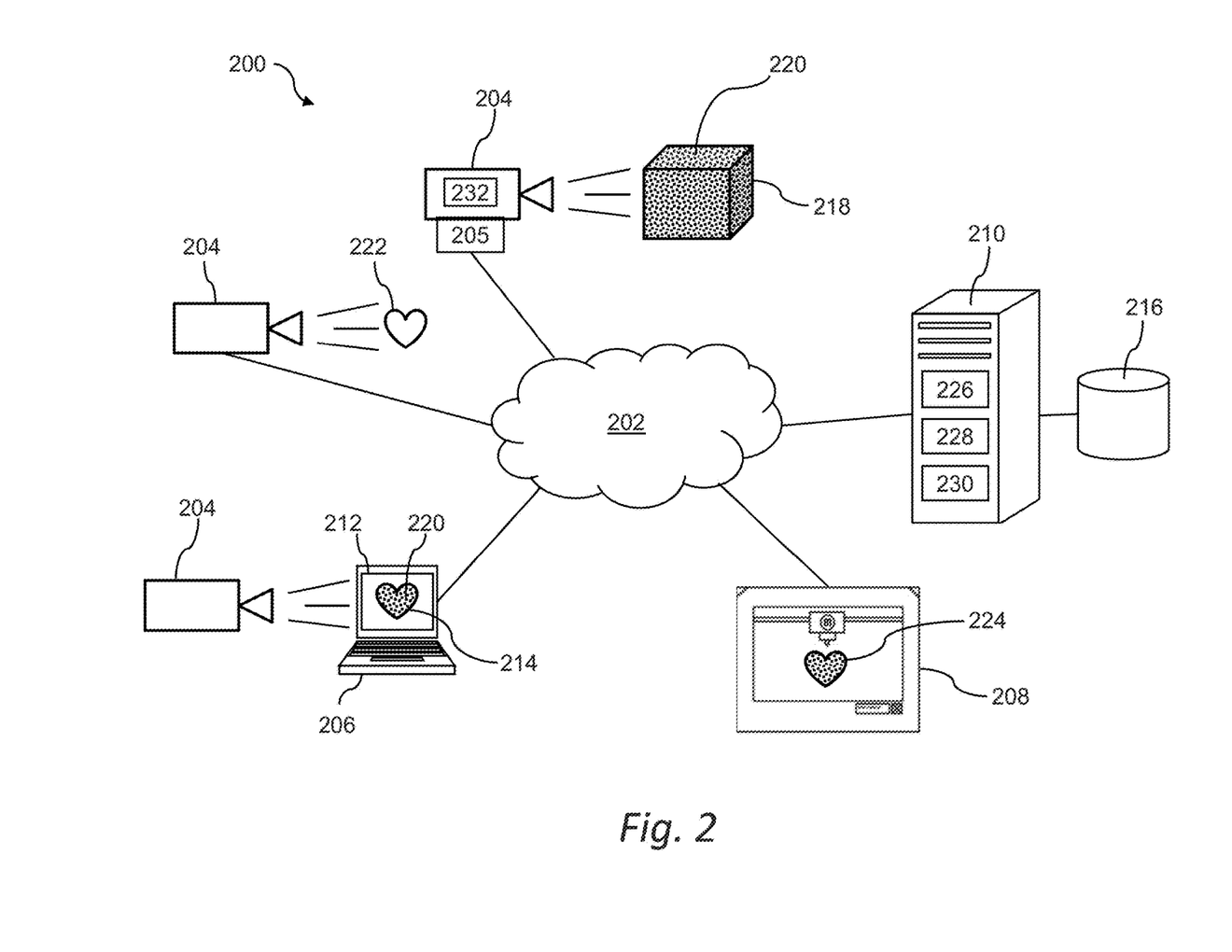
FIG. 2 illustrates a networked environment for scanning a surface feature to a three-dimensional model.

FIG. 2 shows a networked environment for scanning a surface feature to a three-dimensional model. The networked environment 200 may include a data network 202 interconnecting a plurality of participating devices in a communicating relationship. The participating devices may, for example, include a scanner 204 (also referred to interchangeably herein as a "three-dimensional scanner"), a user device 206, a three-dimensional printer 208, and a print server 210.

The data network 202 may be any network(s) or internetwork(s) suitable for communicating data and control information among participants in the environment 200. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMax-Advanced (IEEE 802.16m)) and/or other technologies, as well as any of a variety of corporate area or local area networks and other switches, routers, hubs, gateways, and the like that might be used to carry data among participants in the environment 200. The data network 202 may include wired or wireless networks, or any combination thereof. One skilled in the art will also recognize that the participants shown the environment 200 need not be connected by a data network 202, and thus can be configured to work in conjunction with other participants independent of the data network 202.

The scanner 204 may include features of scanners known in the art. For example the scanner 204 may include any of the features described in U.S. patent application Ser. No. 13/556,368 filed Jun. 24, 2012, U.S. patent application Ser. No. 13/623,996 filed Sep. 21, 2012, U.S. patent application Ser. No. 13/736,210 filed Jan. 8, 2013, and U.S. patent application Ser. No. 14/456,010 filed Aug. 11, 2014, where each of the foregoing is hereby incorporated by reference in its entirety.

The scanner 204 may include a handheld scanner configured to capture a three-dimensional scan of a surface of an object (e.g., a surface feature of an object). The scanner 204 may include, e.g., a laser line scanner. The scanner 204 may also or instead acquire three-dimensional data using one or more of structured light, modulated light, shape from motion, range finding, radiation, ultrasound, contact scanning, volumetric techniques, or any other suitable technique for acquiring a three-dimensional digital surface representation from a physical object.

The scanner 204 may include any hardware or software (or it may be in communication with a device including such hardware and software) that enables it to capture a three-dimensional scan of a surface feature of an object in addition to, or in lieu of, capturing the general, aggregate three-dimensional shape of the object. In other words, in an aspect, the surface feature may be captured independent of an aggregate geometry, or alternatively, the surface feature may be isolated from the aggregate three-dimensional shape of the object after scanning. The surface feature may be a repeating or random surface texture, a protrusion, or the like.

In one aspect, a user may specify a particular surface or region within a field of view as containing or being the surface feature of interest, such as by selecting the corresponding region with any suitable user interface tool.

The scanner 204 may also or instead include any hardware or software that enables it to isolate the surface feature from the general shape of the object automatically, such as by recognizing the shape of the object and then extracting any surface data that deviates from this general shape. This extraction of a surface feature may occur before, during, or after a scan performed by the scanner 204. For example, a user may adjust a setting on the scanner 204 to capture only a surface feature of an object and not the aggregate three-dimensional shape of the object before or during a scan. Alternatively, after the three-dimensional shape of the object is scanned, the scanner 204 (e.g., a processor within the scanner or disposed in another device in communication with the scanner 204 via a network interface 205 or the like) may be configured to isolate the surface feature from the remainder of the scan. Isolating the surface feature may include transforming the scanned surface feature to fit another object's geometry, or transforming the scanned surface feature to fit another object's geometry may be accomplished after the surface feature is isolated.

The user device 206 may include any devices within the environment 200 operated by users to manage, monitor, communicate with, or otherwise interact with other participants in the environment. This may include desktop computers, laptop computers, network computers, tablets, smart phones, smart watches, PDAs, or any other computing device that can participate in the environment 200 as contemplated herein. In one aspect, the user device 206 (and its user interface 212) is integral with the three-dimensional printer 208.

Each user device 206 may generally provide a user interface 212, which may include a graphical user interface, a text or command line interface, a voice-controlled interface, and/or a gesture-based interface. In general, the user interface 212 may create a suitable display on the user device 206 for user interaction. In implementations, the user interface 212 includes a modeling environment, such as a computer-aided design or computer-aided manufacturing environment for the creation, manipulation, modification, and management of three-dimensional models 214. The user interface 212 may also or instead control operation of one or more of the scanner 204 and the three-dimensional printer 208, as well as provide access to and communication with the print server 210 and other resources.

The user interface 212 may be maintained by a locally executing application on the user device 206 that receives data from, e.g., the scanner 204, the three-dimensional printer 208, the print server 210, as well as other resources. In other embodiments, the user interface 212 may be remotely served and presented on one of the user devices 206, such as where the print server 210 or the three-dimensional printer 208 includes a web server that provides information through one or more web pages or the like that can be displayed within a web browser or similar client executing on one of the user devices 206. In one aspect, the user interface 212 may include a voice controlled interface that receives spoken commands from a user and/or provides spoken feedback to the user. In yet another aspect, the user interface 212 works in conjunction with sensors 232 disposed on the scanner 204. The sensors 232 may also or instead be disposed on one or more of the user device 206 and the three-dimensional printer 208. The sensors 232 may include motion sensors, infrared sensors, laser sensors, acoustic sensors, optical sensors, accelerometers, and so forth.

In implementations, the user interface 212 may also or instead be provided by and/or disposed on another participant in the environment 200, such as the scanner 204 or the three-dimensional printer 208.

The three-dimensional printer 208 may be any as discussed herein, e.g., with reference to FIG. 1. In general, the three-dimensional printer 208 may include any computer-controlled devices for three-dimensional fabrication. The three-dimensional printer 208 (as well as other participants in the environment 200) may include a network interface comprising, e.g., a network interface card (NIC), which term is used broadly herein to include any hardware (along with software, firmware, or the like to control operation of same) suitable for establishing and maintaining wired and/or wireless communications. The network interface card may include without limitation a wired Ethernet NIC, a wireless 802.11 networking card, a wireless 802.11 USB device, or other hardware for wired or wireless local area networking. The network interface may also or instead include cellular network hardware, wide area wireless network hardware or any other hardware for centralized, ad hoc, peer-to-peer, or other radio communications that might be used to couple to a data network and carry data. In another aspect, the network interface may include a serial or USB port to directly connect to a computing device such as a desktop computer that, in turn, provides more general network connectivity to the data network 202. The three-dimensional printer 208 may be configured to fabricate an object such as an object having one or more one or more textures, colors, topographies, surface finishes, and so on, including one or more surface features as contemplated herein.

The print server 210 may include data storage (e.g., a memory 226), a network interface 228, and a processor 230 and/or other processing circuitry. In general, the print server 210 (or processor thereof) may perform a variety of processing tasks related to management of networked scanning and printing. For example, the print server 210 may manage scans received at the scanner 204 or the user device 206, print jobs received from the user device 206, and so forth. The print server 210 may also or instead provide related supporting functions such as content search and management. The print server 210 may also include a web server that provides web-based access by the user devices 206 to the capabilities of the print server 210. A print server 210 may also communicate periodically with the scanner 204, the user device 206, and the three-dimensional printer 208 in order to obtain status information concerning, e.g., availability of scanners or printers and/or the status of particular scans or print jobs, any of which may be subsequently presented to a user through the web server or any other suitable interface.

In general, the processor 230 may be configured to receive a three-dimensional scan of the surface of an object from the scanner 204, and isolate a surface texture (or other surface feature) independent of the aggregate shape of the object. The processor 230 may also be configured to display a three-dimensional model 214 of an object (e.g., the first object 218) within a virtual modeling environment on the display, e.g., the user interface 212 of the user device 206. The processor 230 may also receive spatial input from the scanner 204 to navigate to a pose within the virtual modeling environment, and in response to a user input, apply the surface texture to the three-dimensional model 214 according to the pose.

It will be understood that while the processor 230 is shown on the print server 210 in the figure, the processor 230 may also or instead be disposed in one or more of the other entities shown in FIG. 2 such as the user device 206 or the scanner 204.

The print server 210 may also maintain a database 216 of content, along with an interface for users at the user device 206 (e.g., the user interface 212) to search the database 216 for surface features or objects in the database 216. Thus, in one aspect, the print server 210 (or any system including the print server 210) includes a database 216 of three-dimensional models and surface features, and the print server 210 acts as a server that provides a search engine for locating a particular three-dimensional model or surface feature in the database 216. The search engine may be a text-based search engine using keyword text queries, plain language queries, and so forth. The search engine may also or instead include an image-based search engine or the like.

Exemplary interactions between the participants in the environment 200 will now be discussed.

The scanner 204 may capture a three-dimensional scan of a first object 218 (shown as a box-shaped object in the figure), and more particularly a three-dimensional scan of a surface feature 220 of the first object 218. The three-dimensional scan of the surface feature 220 may be stored within a memory of the scanner 204, or it may be transmitted to another participant of the environment 200. For example, the scanner 204 may include a network interface 205 for transmitting the scanned surface feature 220 to one or more of the user device 206, the three-dimensional printer 208, and the print server 210 through the data network 202.

In an aspect, the three-dimensional scan captured by the scanner 204 includes the aggregate shape of the surface of the first object 218 as well as the surface feature 220, and the surface feature 220 must be isolated from the aggregate shape of the surface of the first object 218 in order to use the surface feature 220 independently from the first object 218. Isolation of the surface feature 220 from the aggregate shape may be accomplished through various techniques discussed herein, e.g., through a spatial low-pass filtering technique, or through a manual identification of the surface feature 220 of interest, or some combination of these.

The first object 218 may include any object desired to be scanned by a user. The surface feature 220 may include without limitation one or more of a texture, a color, a finish, a topography, an image, a protrusion, an indentation, a sheen, a shape, an aesthetic aspect of a particular material, a scar, a fray, an opacity or translucence, a layer, and so forth. Thus while this disclosure focuses on the capture, isolation, and re-use of three-dimensional surface features, other features may also be captured and applied to a model in a digital environment, although some such features may not be amenable to direct fabrication.

After capturing the scanned surface feature 220, the scanner 204 may then be used as user interface tool to apply the scanned surface feature 220 to a three-dimensional model 214 in a virtual modeling environment. The three-dimensional model 214 may represent the shape of a second object 222 (shown as a heart-shaped object in the figure), which was previously scanned by the scanner 204 as shown in the figure. Alternatively the three-dimensional model 214 could be provided through a database of digital models, designed by a user, or provided through another resource. The second object 222 may include a different shape or surface feature 220 than the first object 218.

A user may desire to create a third object 224, which includes the shape of the second object 222 (e.g., the heart) but with the surface feature 220 of the first object 218 (e.g., the box). This may be accomplished by applying the scanned surface feature 220 to the three-dimensional model 214 thereby transforming the three-dimensional model 214 into a model corresponding to the third object 224. This newly formed three-dimensional model 214 with the desired surface feature 220 may then be fabricated on the three-dimensional printer 208 thereby creating a real-world version of the third object 224 having the desired surface feature 220 as shown in the figure.

The scanner 204 may be used to control application of the scanned surface feature 220 to the three-dimensional model 214 in a plurality of ways.

Applying the scanned surface feature 220 to an existing three-dimensional model 214 can be accomplished through interaction of the scanner 204 and the user device 206 (and, more particularly, its user interface 212). In general, the scanner 204 may include inertial sensors or other positioning systems capable of resolving a pose of the scanner 204 including a position and rotational orientation in a predetermined relative or absolute coordinate system. Suitable tracking techniques for locating the scanner 204 within the coordinate system include techniques using beacons, inertial data, range finding, image processing, and so forth. This capability may be used to navigate within a virtual space to point, e.g., a virtual spray can, paint brush, or the like at a surface of a three-dimensional model, and with this tool properly positioned a button or other input may be activated to apply the scanned surface feature 220.

In another aspect, after obtaining the scanned surface feature 220, the scanner 204 may scan the second object 222, which creates the three-dimensional model 214 based on the second object 222 and automatically applies the scanned surface feature 220 thereto. Alternatively, the scanner 204 may first scan the second object 222 to create a three-dimensional model 214, and then apply the scanned surface feature 220 thereto—e.g., by scanning the surface feature 220. Applying the scanned surface feature 220 to an existing three-dimensional model 214 can instead be accomplished simply through scanning the surface feature 220. In other words, the scanner 204 may include a setting or feature that allows automatic placement of whatever surface feature 220 is currently being scanned onto a predetermined three-dimensional model 214. More generally, either the texture or the target object can be scanned or obtained from memory, and the texture may be applied automatically or manually to some or all of the exterior surfaces of the model of the target object.

It will be understood that, unless explicitly stated otherwise or clear from the context, features and capabilities of devices and components described throughout this disclosure may be performed by, or made possible through communication with, other devices and components. By way of example, techniques are disclosed for isolating a surface texture. These techniques may be performed by hardware or software included in one or more of the scanner 204, the user device 206, the three-dimensional printer 208, the print server 210, or another component or device.

Figure 3:
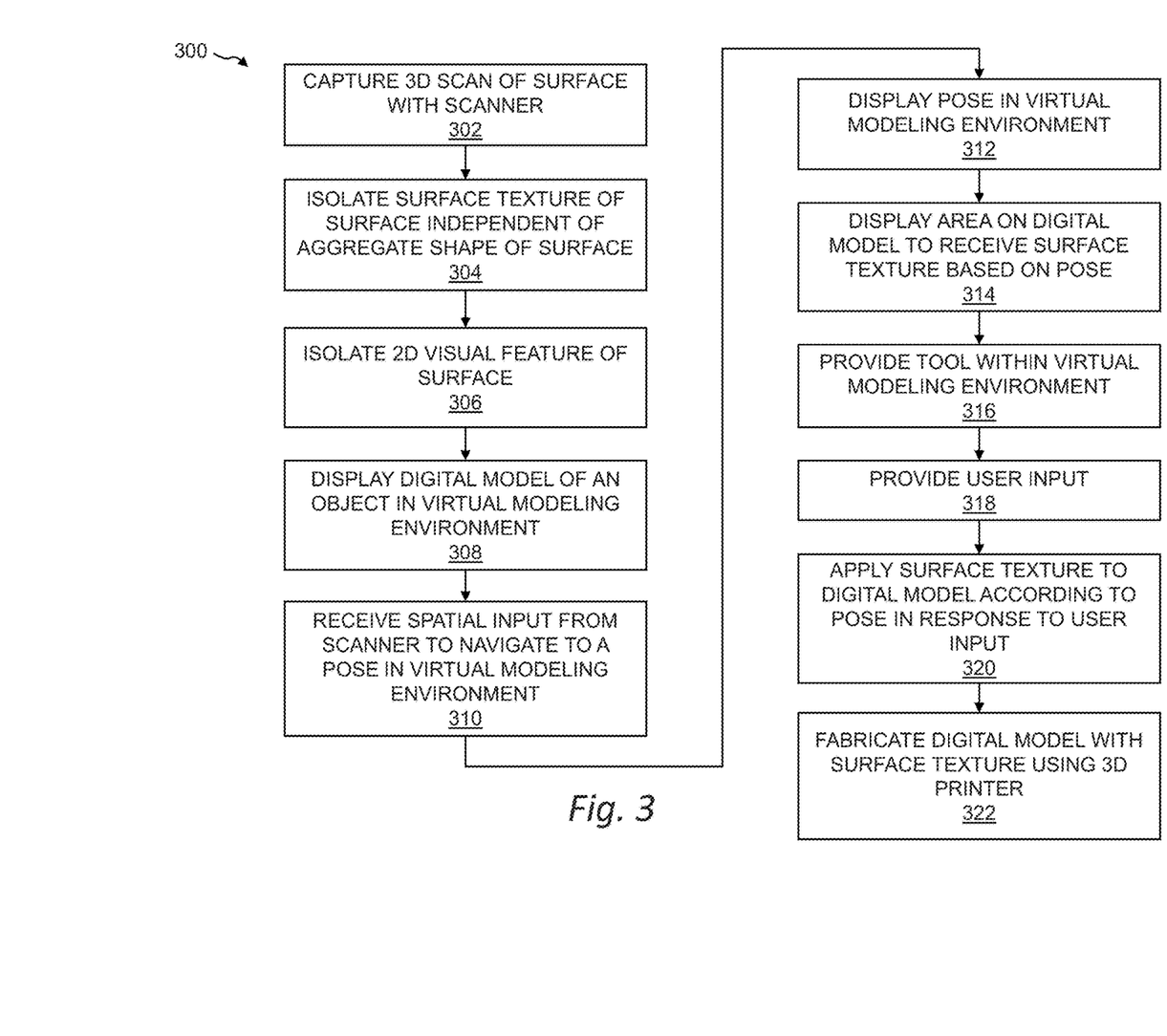
FIG. 3 is a flowchart of a method for scanning a surface feature and applying the surface feature to a three-dimensional model.

FIG. 3 is a flowchart of a method for scanning a surface feature and applying the surface feature to a three-dimensional model. As described herein, the method 300 may include the use of a three-dimensional scanner for scanning a surface feature (e.g., texture) of an object and then applying that surface feature to a digital model in a digital modeling environment using the three-dimensional scanner. In other words, using techniques described herein the surface feature can be isolated (e.g., during the scan or after the scan) so that the surface feature can be used independently of the object, e.g., by applying the surface feature to another digital object.

As shown in step 302, the method 300 may include capturing a three-dimensional scan of a surface with a handheld scanner. The handheld scanner may include a laser line scanner or any other scanner or other device suitable for acquiring three-dimensional surface data from a physical object. By way of example and not limitation, suitable scanners may acquire three-dimensional data using one or more of structured light, shape from motion, and optical or sonic range finding.

Capturing a three-dimensional scan of a surface with the handheld scanner may include isolation of an object to be scanned from its environment. Such isolation can be accomplished through use of the handheld scanner, e.g., by defining an area or volume in which an object is to be isolated. These isolation techniques can also or instead be used for isolating and applying a surface texture to an object to be scanned.

As shown in step 304, the method 300 may include isolating a surface feature of the surface, e.g., a surface texture. The surface texture may, e.g., include a three-dimensional texture independent of an aggregate shape of the surface. Techniques for isolating a surface feature of the surface may be performed during the scan or after the scan. It will be understood that any reference herein to a surface texture may include one or more of the surface features discussed herein unless explicitly stated otherwise or clear from the context.

A variety of three-dimensional processing techniques may be useful employed to isolate and extract surface features from a surface. For example, isolating the surface feature may include spatially low-pass filtering the surface to determine a larger surface shape or context, and that surface characterization may be used to flatten out the surface, e.g., by warping to remove the underlying surface contours so that only the texture remains. In one aspect, user interface controls may be provided for various texture extraction parameters. For example, a user may control sensitivity of the low-pass filtering or the size and shape of the surface area from which texture is extracted. These parameters may be controlled interactively, such as by permitting a user to vary the parameters and view a rendering of the extracted surface texture. The low pass filtered shape, e.g., the underlying surface contours, may also be displayed concurrently alongside the extracted surface texture in order to provide feedback to the user about the shape of the underlying contour that is not being extracted as surface texture. Thus, the user may control parameters, as well as the regions of the surface being interrogated, until a desired surface texture is obtained. This result may then be saved for use in subsequent processing steps. Isolating the surface feature may also or instead include setting bounds for the three-dimensional scan. For example, the handheld scanner may be configured to only acquire three-dimensional data within a bounded volume that includes only surface features on an otherwise planar surface. Bounded areas or volumes may also or instead include portions where data scanning is more sensitive than other portions. In this manner, surface features can be isolated to within these sensitive areas, which are sometimes referred to as "sweet spots" or the like. It will be appreciated that numerous other techniques for feature identification and extraction are known in the three-dimensional processing arts, any of which may be usefully employed to isolate and remove surface texture from the surface of a scanned digital three-dimensional model.

As shown in step 306, the method 300 may also or instead include isolating a two-dimensional visual feature of the surface. The two-dimensional feature may include without limitation one or more of a color of the surface, a texture map, a two-dimensional image, and so on. Isolating a two-dimensional visual feature of the surface may involve the same or similar techniques used for isolating the surface feature described above. Isolating a two-dimensional visual feature of the surface may also or instead include the use of a camera or the like for capturing a two-dimensional image, which may also be planarized based on concurrently acquired three-dimensional data as appropriate. The two-dimensional image may then be warped using known techniques such that it can be applied to the surface of a digital model using the techniques contemplated herein.

As shown in step 308, the method 300 may include displaying a digital model of an object within a virtual modeling environment. The virtual modeling environment may include any as discussed herein or otherwise known in the art, e.g., a Computer-Aided Design (CAD) environment or other three-dimensional visualization and modeling environment, along with a corresponding graphical user interface. The object may be the same object that was scanned by the handheld scanner, or it may be a different object having a different shape, including without limitation a shape obtained from another scan, from a library of objects or shapes, or from a CAD model or the like. The modeling environment may provide a variety of tools for manipulating the digital model. This may include complex changes such as modifications to a mesh surface and addition or removal of components from a library of objects, or relatively simple changes such as modifications to the size, shape, and orientation of the digital model.

As shown in step 310, the method 300 may include receiving spatial input from the handheld scanner to navigate to a pose within the virtual modeling environment. Receiving spatial input from the handheld scanner may be accomplished through well-established techniques known in the art including, e.g., using odometry data from the scanner itself. For example, one or more of the handheld scanner or the device that displays or enables the virtual modeling environment may include sensors such as inertial sensors or the like configured to detect a movement of the scanner, or a position of the handheld scanner relative to the display or some other reference point. In one aspect, the handheld scanner may use a light source (e.g., a light-emitting diode or an infrared laser diode) and a light detector (e.g., an array of photodiodes or an image sensor) to detect movement relative to a predetermined surface such as a display, a tabletop, a wall, a target surface, and so forth.

In certain aspects, the handheld scanner may include an accelerometer or the like that records the direction and strength of forces applied to the handheld scanner, and a data converter that converts these analog forces to digital data for transmission to the device displaying the virtual modeling environment, e.g., via Bluetooth or the like. Pitch, bank, or aim of the handheld scanner can be computed by comparing an angle created by the handheld scanner to a relative baseline point or force, e.g., the gravitational force on the scanner. The handheld scanner may also or instead include an infrared transmitter and/or sensor for communication with the device displaying the virtual modeling environment, where one or both of these components include infrared lights or the like for triangulating their relative position. Other forms of motion detection may also or instead be used such as an array of beacons in a workspace around the scanner. More generally, the system may include one or more sensors to facilitate resolution of a pose of the scanner within any suitable predetermined coordinate system.

Receiving spatial input from the handheld scanner to navigate to a pose within the virtual modeling environment may be a dynamic process. In other words, the pose of the scanner may move across a digital model within the virtual modeling environment (or otherwise within the virtual modeling environment) to, e.g., form a portion of the digital model, add a surface texture, remove a surface texture, otherwise edit or revise the digital model, or perform other modeling functions. In another aspect, a digital model within the virtual modeling environment is updated/revised dynamically as the handheld scanner is scanning a real-world object or otherwise interacting with the real-world object.

As shown in step 312, the method 300 may include displaying the pose in a display of the virtual modeling environment. Displaying the pose may include showing a representation of the handheld scanner within a three-dimensional space that includes a digital model (e.g., the model that is to receive a surface texture). Displaying the pose may also or instead include rendering a projected beam or pathway from the scanner showing a direction in which surface features are to be projected. Displaying the pose may also or instead include rendering a surface of a digital model within the virtual modeling environment that will receive the surface features from the current pose. The representation of the handheld scanner may resemble the scanner itself (which may include a nearly infinite variety of shapes) or a generic or representative version of the scanner, or the representation may be in the shape of another object, e.g., a spray can, a paint brush, an arrow, a bull's eye, crosshairs, and so forth.

The pose may be detected and displayed in the virtual modeling environment automatically, e.g., by moving to a default pose within the virtual environment when the physical scanner is pointed toward a display of the virtual modeling environment, or toward some other predetermined location. This may be an absolute location such as a computer or display, or this may be a relative location such as an origin of a coordinate system, e.g., where a most recent scan was performed. Alternatively, a user input may be required for detection and display of the pose.

The pose of this virtual tool that applies a surface feature to a digital model may be controlled within the virtual modeling environment by detecting movements of the physical handheld scanner and translating these into movements within the virtual modeling environment using any suitable scaling or other transformation techniques. In another aspect, the tool may be independently controlled using, e.g., a mouse, keyboard or other device(s).

As shown in step 314, the method 300 may include displaying an area on the digital model that will receive the surface texture within the virtual modeling environment based on the pose. For example, the handheld scanner may include a first end and a second end, where the first end is configured to be held by a user and the second end includes the end from which objects are scanned. The pose, and the area on the digital model that will receive the surface texture, may be displayed by detecting the second end and a directional position thereof (i.e., where the second end is being aimed relative to the display and contents included therein, e.g., the virtual modeling environment). In this manner, a visual representation of the area in which the scanner is aimed may be displayed through, e.g., coloring, highlighting, shadowing, a graphical symbol, and so forth. The visual representation of the area in which the scanner is aimed may also or instead include the use of directional lines, beams, pathways, and so forth.

As shown in step 316, the method 300 may include providing a tool within the virtual modeling environment. The tool may include without limitation one or more of a tool for a user to adjust a size of the area on the digital model that will receive the surface texture, a tool for a user to adjust a shape of the area on the digital model that will receive the surface texture, a tool for a user to adjust a feature of the surface texture (e.g., adjust a scale of the surface texture in one or more dimensions, adjust a color of the surface texture, adjust a concentration or saturation of the surface texture, and so on), a tool for a user to adjust a speed in which a surface texture may be applied, and so forth. The tool may also or instead include a virtual "scrub bar" that presents raw data as image frames similar to video editing software. The virtual scrub bar may allow a user to manipulate or remove entire frames of data to correct for flawed scan input, e.g., due to bad lighting, movement of the scanned object, the scanner moving too fast, and so forth.

As shown in step 318, the method 300 may include providing a user input for a user to select at least one of the two-dimensional visual feature and the surface texture for application to the digital model. In one aspect, the user input includes pushing a button (or initiating another physical actuation means) on the handheld scanner. The user input may also or instead include an action taken by the user on the user interface displaying the virtual modeling environment, where such an action can include one or more of using a touchscreen, using a physical button, dial, or the like on a user device, use of a computing device, initiating a voice command, and so on.

As shown in step 320, the method 300 may include, in response to the user input, applying the surface texture to the digital model according to the pose. In one aspect, the user input alone applies the surface texture to the digital model. In another aspect, to apply the surface texture, the pose must be in a position such that it is disposed in the area on the digital model that will receive the surface texture, or the pose must be oriented toward such an area. In an implementation, a user can configure the pose (or an orientation of the pose) for movement across an area of the digital model by moving the handheld scanner and pressing a button in order to apply the surface texture to that area of the digital model. In this manner, the handheld scanner acts a digital applicator, e.g., a digital spray can, paint brush, computer mouse-like device, and so on.

As shown in step 322, the method 300 may include fabricating the digital model with the surface texture using a three-dimensional printer. In this manner, a texture or surface feature of a real world object can be applied to a digital model (which may include a completely different shape) and then fabricated on-demand by a user.

In an aspect, scanning and applying a texture can occur simultaneously. By way of example and not of limitation, a handheld scanner can be used to scan a person within a room and apply a texture to that person simultaneously. In this manner, the person can be isolated from the environment of the room so that the texture can be applied only to that person. In one aspect, the handheld scanner includes a "sweet spot" or the like where data is more sensitive for capturing scans or applying surface textures. In such aspects, data can be extrapolated from within the sweet spot and outside of the sweet spot for, e.g., capturing scans or applying surface textures. Capturing scans or applying surface textures can also or instead be accomplished through other various techniques as discussed herein.

Figure 4:
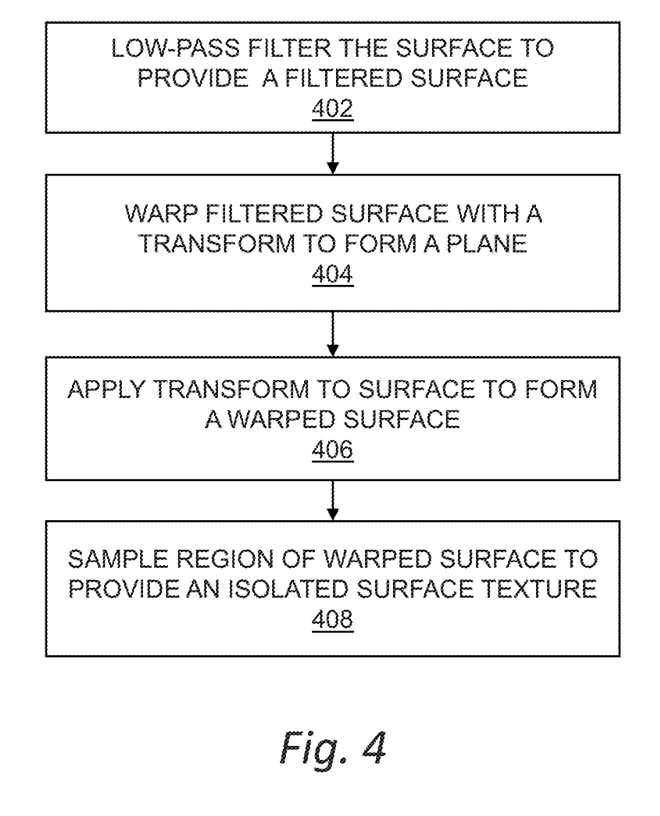
FIG. 4 is a flowchart of a method for isolating a surface texture.

FIG. 4 is a flowchart of a method for isolating a surface texture. One of ordinary skill will recognize that the method 400 demonstrates one such technique, and that other techniques are possible. It will be noted that the separation of a macro-surface from local surface features is necessarily a subjective process that may not be amenable to a single result or answer. Thus, as described above, this method 400 may be performed continuously and/or interactively so that a user can vary the output until a satisfactory result is obtained.

As shown in step 402, the method 400 may include low-pass filtering the surface to provide a filtered surface. This spatially low-pass filtered surface may generally represent an aggregate shape of the object being scanned without high-frequency components such as local surface texture. The filtering parameters may optionally be varied manually by a user, or automatically using, e.g., an objective metric for feature size, feature density, rate of change in curvature, or any other suitable metrics. Also, amplitude of the surface texture may be controlled through low-pass filtering techniques.

As shown in step 404, the method 400 may include warping the filtered surface with a transform to form a plane. This Cartesian transformation provides a map for removing the aggregate shape from the surface. By applying this transformation to the original surface, the aggregate shape can be removed so that only local surface features remain.

As shown in step 406, the method 400 may include applying the transform to the surface to form a warped surface. The warped surface may resemble a substantially flat, planar surface that includes the desired surface texture.

As shown in step 408, the method 400 may include sampling a region of the warped surface to provide an isolated surface texture. The isolated surface texture may thus be isolated from an aggregated shape of the object initially scanned. This isolated surface texture can then be applied to a plurality of shapes, even if the shapes are completely different from the object initially scanned.

Figure 5:
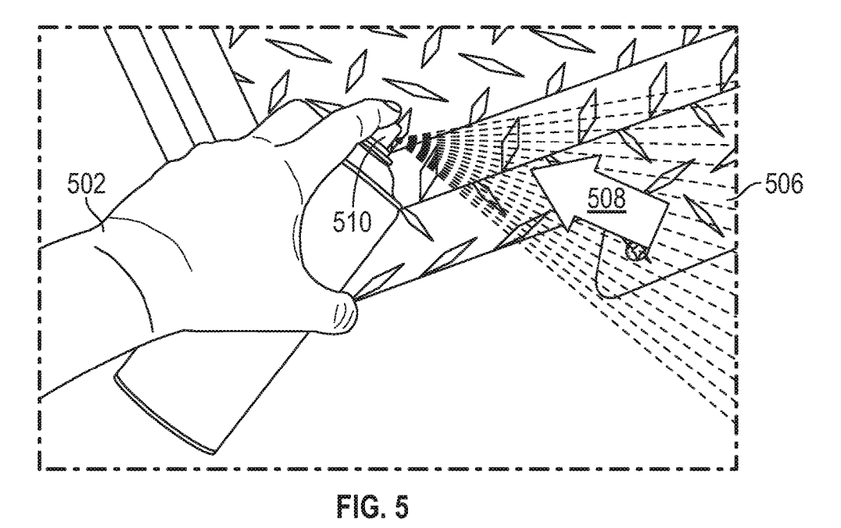
FIG. 5 illustrates capturing a three-dimensional scan of a surface with a handheld scanner.

FIG. 5 illustrates capturing a three-dimensional scan of a surface with a handheld scanner. Specifically, the figure shows a user 502 operating a scanner 504 to capture a three-dimensional scan of a surface 506, where the arrow 508 graphically illustrates the capture of data from the physical surface by the scanner 504.

In the figure, the scanner 504 is shown in the shape of a spray can, but one of ordinary skill in the art will recognize that an infinite number of shapes and configurations of the scanner 504 are also or instead possible, including more conventional shapes. In one aspect, the scanner 504 may be realized using a smart phone or similar handheld or mobile device with suitable inertial sensors, camera(s), processor(s), and so forth. The scanner 504 may include a user input 510, where actuation of the user input 510 enables the scanner 504 to scan a surface 506.

As discussed throughout this disclosure, the surface 506 may include a surface feature (e.g., a surface texture), which is shown in the figure to include a diamond plate design (such as the kind typically found on a plate of sheet metal). The surface feature may also or instead include other textures or three-dimensional features, as well as two-dimensional features. By way of example only (because an infinite number of surface textures for scanning are possible), various surface textures that can be scanned from one shape and applied to other shapes may include: dimpled surfaces (e.g., a golf ball), stitches, indentations, divots, projections, fuzzy or furry surfaces (e.g., a tennis ball or a teddy bear), hairy surfaces, weathered surfaces, scratches, geometric patterns, non-uniform surfaces or patterns, cracks, rocky or pebbly surfaces, honeycombs, matte surfaces, eggshell surfaces, weaved surfaces, corrugated surfaces, wavy surfaces, grainy surfaces, rough surfaces, bubbly surfaces, bumpy surfaces, surfaces resembling building materials (e.g., brick, stone, concrete, cinderblock, wood, siding, plaster, and so on), etchings, brush strokes, rippled surfaces, fibrous surfaces, and so forth. By way of example only (because an infinite number of two-dimensional features for scanning are possible), various two-dimensional features that can be scanned from one shape and applied to other shapes may include: color, patterns, images, reflective properties, opacity, translucence, sheen, and so on.

Figure 6:
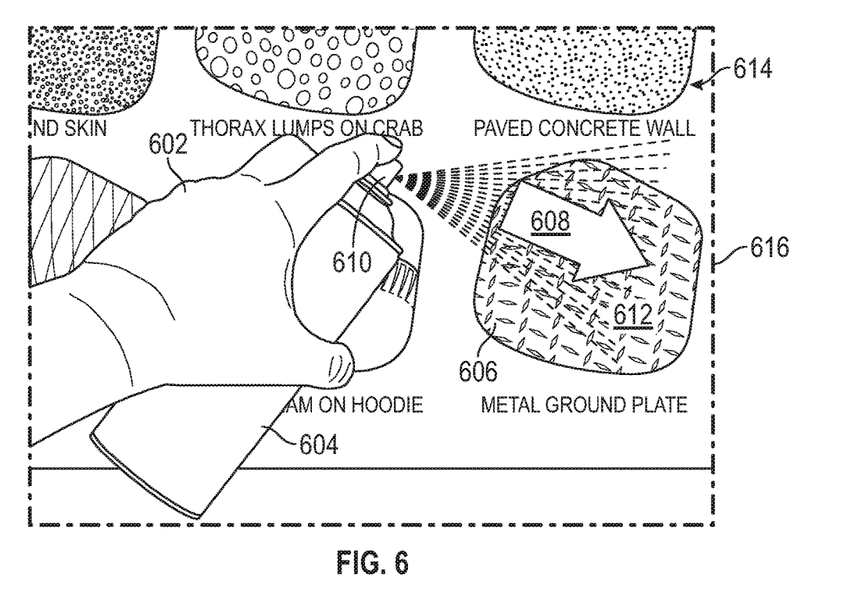
FIG. 6 illustrates applying a surface feature to a three-dimensional model with a handheld scanner.

FIG. 6 illustrates applying a surface feature to a three-dimensional model with a handheld scanner. Similar to the figure above, a user 602 may operate a scanner 604 or other device to apply a surface feature 606 to a three-dimensional model 612, where the arrow 608 graphically illustrates the application of the surface feature 606 (either from the scanner 604, or from a stored version of the surface within the modeling environment of the display 614) onto the three-dimensional model 612.

As shown in the figure, the scanner 604, which again is shown in the shape of a spray can, may be the device that applies the surface feature 606 to the three-dimensional model 612. The scanner 604 may similarly include a user input 610, where actuation of the user input 610 enables the scanner 604 to apply the surface feature 606 to the three-dimensional model 612.

The three-dimensional model 612 may be included in a virtual modeling environment 614 rendered on a display 616 of a user device. To apply the surface feature 606 to the three-dimensional model 612, the user 602 may orient the scanner 604 toward the display 616 containing the virtual modeling environment 614 such that a pose of the scanner (or orientation of the pose) is disposed over an area of the three-dimensional model 612. Then, when the user input 610 is actuated (e.g., a button is pressed), the surface feature 606 may be applied onto the three-dimensional model 612.

In general, this operation may be performed by literally directing the scanner 604 toward the corresponding region within the display 616. A number of related and intuitive controls may be provided. For example, moving the scanner 604 away from the display may increase the scale of the surface feature 606, or change the projected surface area onto which the surface feature 606 is applied, or some combination of these. Similarly, rotating the scanner 604 may cause the surface feature 606 to rotate in a corresponding fashion. In another aspect, the scanner 604 may be used to control a virtual tool within the virtual modeling environment 614, e.g., by acting as a three-dimensional mouse or similar input to control movement of a cursor or tool within the environment. This may more conveniently facilitate access to surfaces of the model (e.g., top, bottom, sides, back) that do not project forward out of the display 616.

It will be appreciated that numerous additional user controls may be provided including tools to scale the surface feature 606 (in two or three-dimensions), to select from among a number of surface features, to store, retrieve, delete, or save surface features, to modify a surface texture or the like from a library, and to otherwise facilitate the capture and use of surface features as contemplated herein.

User controls may be provided through or enabled by use of the handheld scanner. For example, the handheld scanner can be used to add or erase textures or other features of a digital model, to undo or redo edits and revisions, to select certain portions of a digital model, and so forth. The handheld scanner can also or instead be used to provide a user with feedback relative to a scanning process, an editing process, a digital drawing process, and the like. Such feedback can include without limitation visual feedback (e.g., in the virtual modeling environment or through LEDs and the like included on the scanner), audio feedback (e.g., beeps, clicks, "busy" sounds, spoken words, music, and so on), force feedback (e.g., vibrating, haptics, and so on), and the like.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
   capturing a three-dimensional scan of a surface with a handheld scanner;
   isolating a surface texture of the surface comprising a three-dimensional texture independent of an aggregate shape of the surface, wherein isolating the surface texture includes:
      low-pass filtering the surface to provide a filtered surface;
      warping the filtered surface with a transform to form a plane;
      applying the transform to the surface to form a warped surface; and
      sampling a region of the warped surface to provide an isolated surface texture;
   displaying a digital model of an object within a virtual modeling environment;
   receiving spatial input from the handheld scanner to navigate to a pose within the virtual modeling environment; and
   in response to user input, applying the surface texture to the digital model according to the pose.

2. The method of claim 1 further comprising fabricating the digital model with the surface texture using a three-dimensional printer.

3. The method of claim 1 wherein the handheld scanner is a laser line scanner.

4. The method of claim 1 wherein the handheld scanner acquires three-dimensional data using one or more of structured light, shape from motion, and range finding.

5. The method of claim 1 wherein the user input includes pushing a button on the handheld scanner.

6. The method of claim 1 further comprising displaying the pose in a display of the virtual modeling environment.

7. The method of claim 1 further comprising displaying an area on the digital model that will receive the surface texture within the virtual modeling environment based on the pose.

8. The method of claim 7 further comprising providing a tool within the virtual modeling environment for a user to adjust a size of the area on the digital model that will receive the surface texture.

9. The method of claim 7 further comprising providing a tool within the virtual modeling environment for a user to adjust a shape of the area on the digital model that will receive the surface texture.

10. The method of claim 7 further comprising providing a tool within the virtual modeling environment for a user to adjust a scale of the surface texture in one or more dimensions.

11. The method of claim 1 further comprising isolating a two-dimensional visual feature of the surface.

12. The method of claim 11 wherein the two-dimension feature includes a color of the surface.

13. The method of claim 11 wherein the two-dimensional feature includes a texture map.

14. The method of claim 11 wherein the two-dimensional feature includes a two-dimensional image.

15. The method of claim 11 further comprising providing a user input for a user to select at least one of the two-dimensional visual feature and the surface texture for application to the digital model.

16. A computer program product comprising non-transitory computer-executable code embodied in a non-transitory computer readable medium that, when executing on one or more computing devices, performs the steps of:
   receiving a three-dimensional scan of a surface;
   isolating a surface texture of the surface comprising a three-dimensional texture independent of an aggregate shape of the surface, wherein isolating the surface texture includes:
      low-pass filtering the surface to provide a filtered surface;
      warping the filtered surface with a transform to form a plane;
      applying the transform to the surface to form a warped surface; and
      sampling a region of the warped surface to provide an isolated surface texture;
   displaying a digital model of an object within a virtual modeling environment;
   receiving spatial input from a handheld scanner to navigate to a pose within the virtual modeling environment; and
   in response to user input, applying the surface texture from the first object to the digital model according to the pose.

17. The computer program product of claim 16, further comprising code that performs the steps of:
   displaying the pose in a display of the virtual modeling environment; and
   displaying an area on the digital model that will receive the surface texture within the virtual modeling environment based on the pose.

18. A system comprising:
   a handheld scanner configured to capture a three-dimensional scan of a surface, the handheld scanner including a first network interface; and
   a user device including a processor, a memory, and a display, the user device coupled to the handheld scanner through the first network interface, the processor configured to perform the steps of:
      receiving the three-dimensional scan of the surface from the handheld scanner;
   isolating a surface texture of the surface comprising a three-dimensional texture independent of an aggregate shape of the surface, wherein isolating the surface texture includes:
      low-pass filtering the surface to provide a filtered surface;
      warping the filtered surface with a transform to form a plane;
      applying the transform to the surface to form a warped surface; and
      sampling a region of the warped surface to provide an isolated surface texture;
   displaying a digital model of an object within a virtual modeling environment on the display;
   receiving spatial input from a handheld scanner to navigate to a pose within the virtual modeling environment; and
   in response to user input, applying the surface texture to the digital model according to the pose.

* * * * *

UNITED STATES PATENT AND TRADEMARK OFFICE
CERTIFICATE OF CORRECTION

PATENT NO. : 9,934,601 B2  
APPLICATION NO. : 14/804758  
DATED : April 3, 2018  
INVENTOR(S) : Mark Palmer et al.

It is certified that error appears in the above-identified patent and that said Letters Patent is hereby corrected as shown below:

In Column 22, Line 7, Claim 16, delete "from the first object".

Signed and Sealed this
Twenty-second Day of May, 2018

Andrei Iancu
*Director of the United States Patent and Trademark Office*